Oct. 24, 1939.  A. P. HELDENBRAND  2,177,214
PROCESS FOR RECONDITIONING TUBING
Filed Oct. 15, 1935
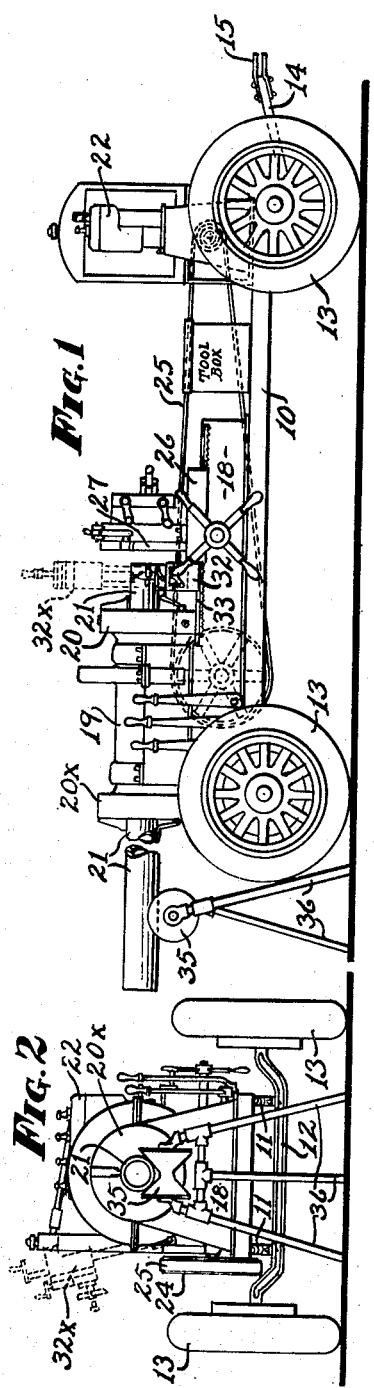
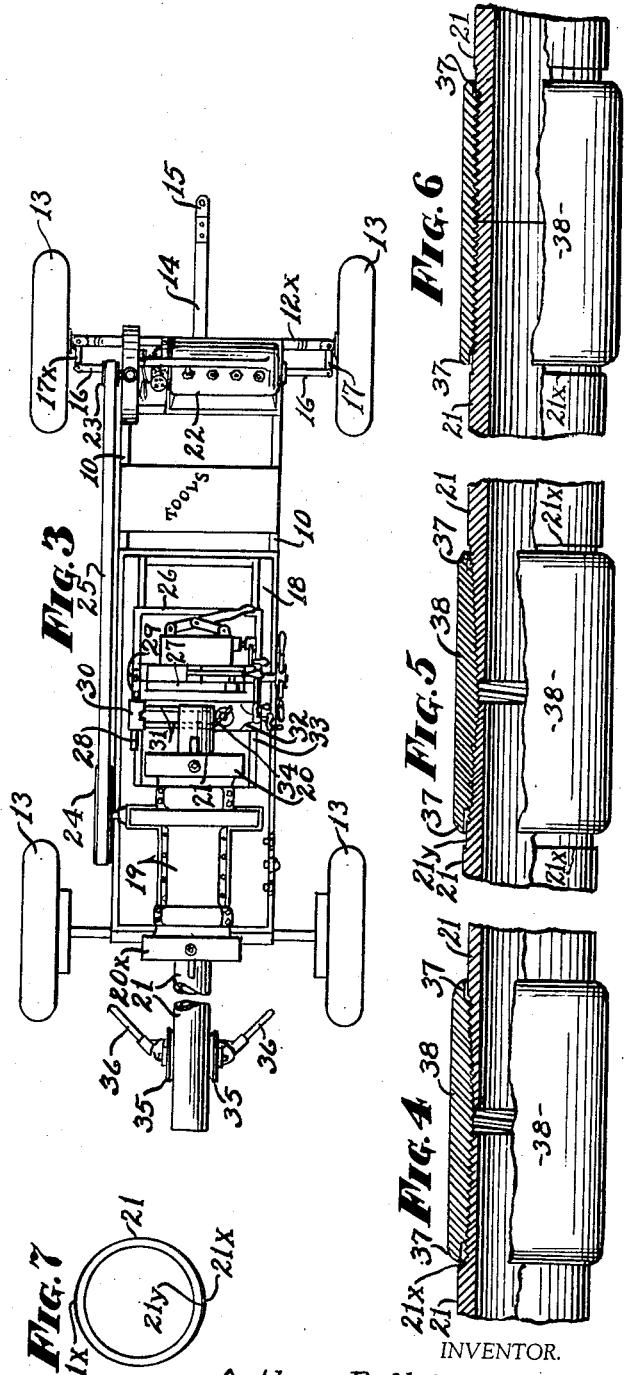
INVENTOR.
Arthur P. Heldenbrand
BY
M. Y. Charles
ATTORNEY.

Patented Oct. 24, 1939

2,177,214

UNITED STATES PATENT OFFICE 2,177,214

PROCESS FOR RECONDITIONING TUBING

Arthur P. Heldenbrand, Tonkawa, Okla.

Application October 15, 1935, Serial No. 45,076

2 Claims. (Cl. 29—156)

My invention relates to a process of an apparatus for making tight joints between tubing sections.

The object of my invention is to prepare used tubing for reuse by reconditioning the end of the tubing so it is round and then threading the tubing with perfectly formed threads to receive the tubing coupling.

In order to do this, the end of the tubing should be cut off, the tube should then be turned in a lathe like machine so that the end of the tube is round, after which a die is run on the end of the tube to cut the threads. All of these operations should be done with one set up in the machine in order to get a perfect job.

A still further object is to provide a portable machine which may be taken into an oil field and placed in an advantageous position, adjacent a pile of used tubing so that the tubing may be reconditioned by the use of my machine and process at the well, and thus save the expense and work and time that would ordinarily be required to haul the tubing to some shop where it might be reconditioned.

These and other objects will be more fully explained as this description progresses.

The machine which accomplishes this process is illustrated in the accompanying drawing in which Fig. 1 is a side view of the device. Fig. 2 is a rear view of Fig. 1. Fig. 3 is a plan view of Fig. 1. Fig. 4 is a side and sectional view of a joint as it is made without using my process and showing the poor joint so obtained. Fig. 5 is a side and sectional detail view of a joint in which my process has been employed, the ends of the tubes being tapered and threaded. Fig. 6 is a view, the same as Fig. 5, except that the ends of the pipe are cut straight instead of tapered and then threaded. Fig. 7 is an end view of a pipe or tube, which has been prepared by my process and apparatus, to be threaded.

In the drawing, similar numerals of reference designate the same parts throughout the several figures.

At 10 is a frame element carried on springs 11 that are mounted on an axle element 12 that are carried on wheels 13. At 14 is a tongue element, having a hitch 15 so that the device may be attached to a truck or automobile so that the device may be transported. The opposite end of the tongue 14 is connected to the front axle 12x and link 16 which joins the steering arms 17 and 17x to guide the front wheels for trailing purposes as will readily be understood.

On the frame 10 is positioned, and rigidly attached, a bed element 18, carrying a head stock 19 in which is a driven spindle carrying a pair of chucks 20 and 20x in which is rigidly held the pipe 21. At 22 is a power unit having a belt pulley 23 and at 24 is another belt pulley that drives the mechanisms to revolve the chucks 20 and 20x and revolve the tube 21 for the purpose of the invention. At 25 is a belt driven by the pulley 23 and driving the pulley 24.

At 26 is a carriage, slidably arranged on the bed 18 and on which is mounted dies in a die holder 27.

The machine carried on the bed 18 is substantially a pipe threading machine, driven by the motor 22. At 28 is a shaft which is rigidly attached to the carriage 26 by bolts as indicated at 29. Revolvably mounted on the shaft 28 is a casting 30, carrying a pair of shafts 31 on which is mounted a compound tool rest 32, one end of which is adapted to rest on the way 33 on the bed 18.

At 34 is a tool carried on the tool rest 32 in position for cutting the end of the tube 21.

It will be understood that the tube 21 is long, possibly 20 feet or more. Therefore it is necessary that the outer end of the tube shall be supported while the other end is being worked on. The support for the outer end of the tube comprises a V shaped pulley 35 which is supported on a tripod arrangement 36. It will be understood that the pulley 35 will roll for longitudinal adjustments of the tube 21 and when the tube 21 is rotated, it will slide in its rotary motion in the V shape of the pulley 35.

It will be understood that the ends of the tubing, especially in used tubing, are quite often out of round. Therefore it is impossible to put perfect threads on the end of the tube. In other words; there will be places on the tube where the threads will be deep, and other places where it will be shallow, and the result is that the threads are not uniformly formed. Therefore it is desirable to machine the end of the pipe so that it is round, so that a uniform thread may be cut thereon.

In Fig. 7 is shown an end view of the pipe 21, which shows that the pipe is out of round as shown at 21x and the end of the pipe has been machined so that it is round as indicated at 21y.

In Figs. 4, 5, and 6 is shown the standard type of coupling that is employed in the oil fields. The coupling is provided with a sleeve like portion 37 at each end and the inside of the coupling between the sleeve like portions 37 are threaded to receive the ends of the tubes 21.

In Fig. 4 is shown two pipes coupled together by the coupling 38 and at 21x is the out of round portion of the tube and it is seen that the sleeve portion 37 of the coupling 28 has contacted the portion 21x which prevents the further screwing of the pipe 21 into the coupling 38. Even though the threads on the pipe 21 are loosely screwed into the coupling 38, the joint between the pipe 21 and the coupling 38 is not an oil tight joint.

In Fig. 6 is shown a construction similar to that shown in Fig. 5 except that the threads in the coupling are cut on a straight line instead of being tapered as shown in Fig. 5.

As previously stated, it is desirable to cut off the end of the pipe 21, then machine the end of the pipe until it is round, and then cut threads on the pipe, all of which should be done with one set up of the pipe in the machine. Heretofore this has been impossible with the machines that were in use, but is now made possible by employing my attachment of the compound tool rest 32 as I have applied it to the machine.

The process of reconditioning the tubing is as follows: The machine is taken to the oil well where the tubing therefrom is piled in a pile on the ground or a rack. The pile of tubing is then examined and tested to be sure there is no thin places worn in any of the tubes, and if there is, that tube is discarded. After the pile of tubing has been thus examined, the process of rethreading the tubing is commenced and is as follows:

The tool rest is placed in position as shown in Figs. 1 and 3 and the tube 21 is revolved so that the end of the pipe is machined, true and round and either tapering or straight, as the case may be, preparatory to being threaded, care being taken that the machined face is carried well back on the tube so that the sleeve portion 37 of the coupling will not strike the shoulder 21x when the coupling is screwed on the pipe 21.

After the end of the pipe 21 has thus been prepared, the carriage 26 is moved rearwardly so that the shafts 31 are carried from under the end of the pipe 21 whereupon the compound tool rest 32 and shaft 31 may be rocked upwardly to the dotted position 32x, whereupon the carriage 26 carrying the die 27 may be moved forward until the die engages the end of the pipe 21 and the desired thread is cut thereon.

Attention is called to the fact that the end of the pipe was machined and the thread cut without removing the pipe from the machine or changing the center thereof in the machine, therefore a uniform and perfectly formed thread is obtained and the joints between the pipe and the coupling will be oil tight.

Such modifications may be employed as lie within the scope of the appended claims without departing from the spirit and intention of the invention. Having thus described my invention, what I claim as new and desire to secure by Letters Patent is:

1. The process of reconditioning tubular goods by first machining the ends of tubular elements to a uniform predetermined gauge and then threading a portion of said machined portion; and then machining the internal ends of tubular couplings to a uniform gauge such that they will receive and closely fit the machined portion of the first said tubular elements, and then threading the intermediate internal portion of said couplings to fit and receive the threads on the first said tubular elements so that the ends of the tubular elements may be threaded into the coupling and the machined ends of the coupling will engage only the machined portion of the first said tubular elements.

2. The process of reconditioning tubular goods in which the tubular goods is first measured to determine whether or not the tubular goods is worthy of further use after which the tubes are placed in a turning device in which the ends of the tubes are machined to a uniform predetermined gauge, which process comprises threading a portion of the machined portion, and then machining the internal ends of the tubular couplings to a uniform gauge such that they will receive and closely fit the machined portion of the first said tubular goods, and then threading the intermediate internal portion of said coupling to fit and receive the threads on the first said tubular goods so that the ends of the tubular goods may be threaded into the coupling and the machined ends of the coupling will engage only the machined portion of the first said tubular goods.

ARTHUR P. HELDENBRAND.